April 29, 1930.   G. B. GALLASCH   1,756,785
OPTICAL MEASURING INSTRUMENT
Filed May 29, 1926
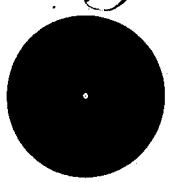
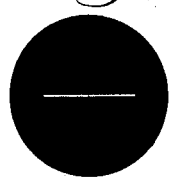
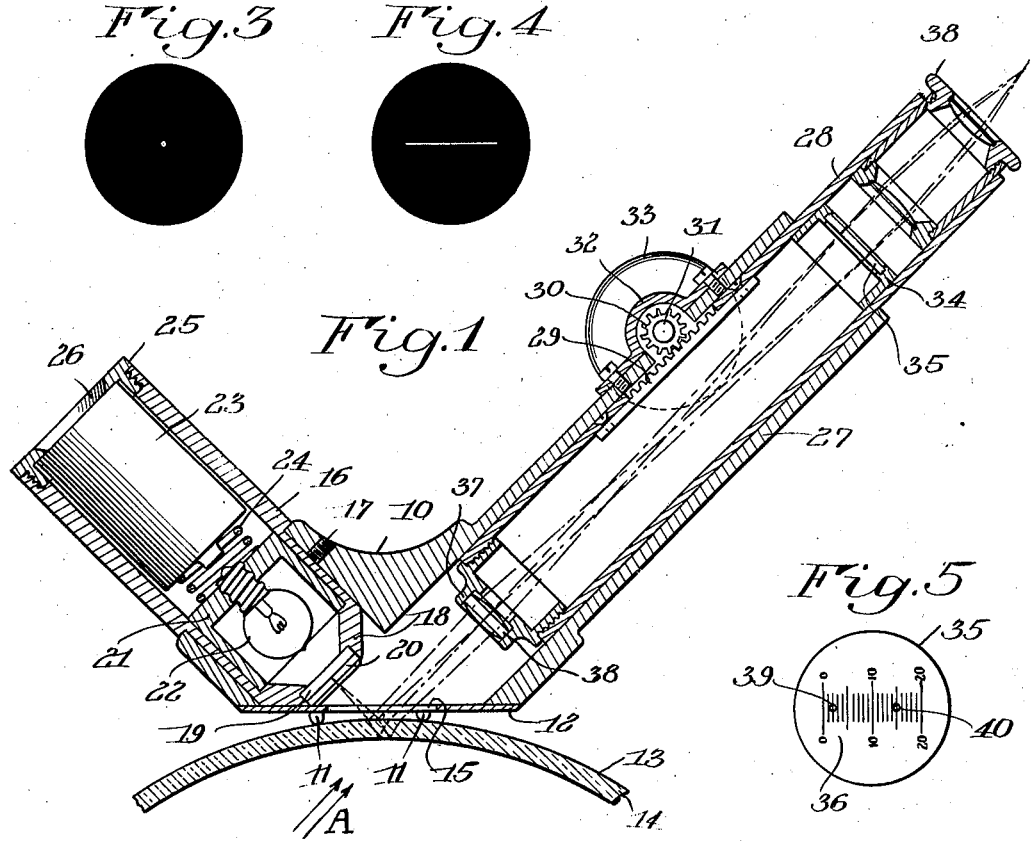
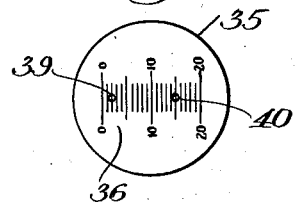
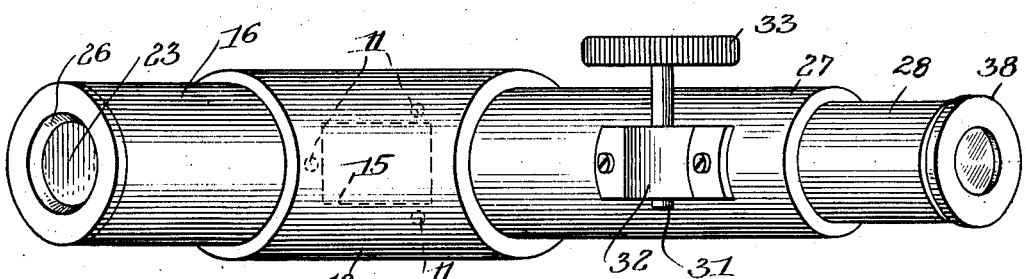
INVENTOR
George B. Gallasch
BY
his ATTORNEYS Patented Apr. 29, 1930

1,756,785

UNITED STATES PATENT OFFICE

GEORGE B. GALLASCH, OF ROCHESTER, NEW YORK, ASSIGNOR TO BAUSCH & LOMB OPTICAL COMPANY, OF ROCHESTER, NEW YORK, A CORPORATION OF NEW YORK

OPTICAL MEASURING INSTRUMENT

Application filed May 29, 1926. Serial No. 112,527.

This invention relates to measuring instruments of the optical variety, one object of the invention being to provide a practical and efficient instrument of this character for measuring the thickness of a wall or plate of glass or other transparent material by measuring the relative displacement of the reflections of a light beam projected upon opposite surfaces of the wall, respectively. Another object is to provide such an instrument of a self-contained and convenient character including a source of light for producing the spaced reflections from opposite wall surfaces, and an optical system provided with means for measuring the relative displacement of the reflected beams, as a measure of the thickness of the wall, so that this dimension may be obtained entirely from one side of the wall, as particularly convenient in measuring certain bodies such, for example, as the thickness of a wall of an electric lamp bulb. A further object is the provision of an instrument of the above nature having a unitary and compact form of construction including a lamp and an optical system and scale adapted to be held in the hand and so positioned against one surface of a wall as to produce reflections from its opposite surfaces the relative displacement of which indicates on the scale the thickness of the wall expressed directly in terms of a desired unit of measure.

To these and other ends the invention resides in certain improvements and combinations of parts, all as will be hereinafter more fully described, the novel features being pointed out in the claims at the end of the specification.

In the drawings:—

Figure 1 is a sectional elevation of an instrument embodying the present invention;

Figure 2 is a top plan view of the same;

Figures 3 and 4 are enlarged views of apertured light projecting diaphragms adapted for use with the instrument; and Figure 5 is an enlarged view of a measuring scale employed in the instrument and showing the light beam reflections in conjunction therewith as they appear in the use of the instrument.

Similar reference numerals throughout the several views indicate the same parts.

The invention is disclosed herein, by way of illustration, as embodied in an instrument comprising a frame or casing 10 carrying the light projecting and measuring sight means to be hereafter described. This frame may be supported in any suitable manner for the application thereto of a body to be measured, or the frame may be carried in the hand and applied to the wall or other body to be measured. In the present instance the frame is adapted for the latter method of use by means of a plurality of spaced contacts, or feet 11, projecting from the bottom 12 of the frame and adapted to be engaged with one surface 13 of a body or wall 14, to position the instrument for use relative to the latter. The frame has an opening 15 in its bottom between the contacts 11 and adjacent the wall to be measured to provide for the projection of light thereagainst and its reflection therefrom back into the instrument.

The light projecting means comprises preferably a projecting tube portion 16 mounted at its lower end in a well or bore in frame 10 and secured therein as by means of a set screw 17. The lower end of tube portion 16 is reduced in diameter as at 18 and has seated in this reduced open end a diaphragm 19 provided with an aperture for projecting a light beam of predetermined form. This diaphragm may have various constructions, being in the present instance made of glass and silvered on one side with an aperture cut in the silver film, as illustrated in Figures 3 and 4 which show different forms which may be used for the aperture. Figure 3 shows a pin point aperture while Figure 4 shows a long narrow slit. The aperture in Figure 3 is employed in the present instance, being formed on the lower side of the disk 19 and protected by a transparent cover disk 20, as shown.

The source of light for the projected beam may take various forms but it has been found that a very simple, compact and self-contained arrangement is afforded by the use of an electric lamp and a dry cell or battery carried in the projection tube portion. To this end there is mounted in tube 16 a cup-shaped holder 21 formed at its central axis with a socket for the reception of an electric lamp 22. The base of the lamp projects upwardly through the base of the holder 21 for contact with the battery which is indicated at 23. As shown, the battery is carried in tube 16 and yieldingly spaced from the lamp by means of a spring 24. Tube 16 carries at its upper end a detachable cap or ring 25 adapted to be removed for the insertion of the battery and lamp parts. Cap 25 has a central opening 26 in which a finger may be applied for pressing battery 23 downwardly against compression spring 24 until the central battery terminal contacts with the central contact point of the lamp, a circuit being thus established with a return through the tube 16 or spring 24 as well understood in the art. By this means the lamp may be quickly and conveniently energized for such periods as may be desired and when energized, it projects a beam of light through the aperture of the diaphragm and through the opening 15 in the bottom of the frame against the wall or plate the thickness of which is to be measured. As shown, the projection tube portion 16 is arranged at a suitable inclination to frame 10 for producing spaced reflections from the opposite surfaces of the transparent wall 14, an angle of inclination of approximately 45° being employed in the present embodiment as affording suitable displacement and intensity of the reflected beams.

A light beam so projected against the glass wall to be measured is reflected by the near surface of the glass and, in addition, a portion of the incident beam travels through the thickness of the glass and is reflected back in parallel spaced relation from the remote wall surface as indicated in the drawings. The relative displacement or distance apart of the reflected beams depends upon the angle of incidence, the index of refraction and the thickness of the glass. The refractive index of glass ordinarily employed for various commercial uses is substantially constant and hence, for a given angle of incidence and index, the relative displacement of the reflected beams may be taken, for practical purposes as proportional to the thickness of the glass, so that by measuring such displacement by a suitably coordinated optical system and scale, the thickness of the glass may be directly observed.

The means for observing and measuring the relative displacement of the reflected light beams comprises in the present instance a tubular extension 27 on frame 10 having an inclination of approximately 45° to correspond with the angles of incidence and reflection of the light beam. Sliding longitudinally on frame portion 27 is an adjustable sight tube 28 provided with a rack 29 opposite a slot in the extension 27 for meshing with a pinion 30 on a shaft 31 journaled at its ends in a cap 32 carried by frame extension 27. Shaft 31 carries a knob 33 for rotating pinion 30 and thus effecting focusing adjustment of tube 28.

The invention is embodied in the present instance in an arrangement in which the light beam is projected in a form determined by the apertured diaphragm and the spaced reflections of this beam are measured by a scale associated with the sight tube. For this purpose there is positioned in the sight tube, adjacent the eyepiece, a mounting 34 for the measuring scale. The latter is preferably formed as a glass disk 35 on which a scale 36 is marked as shown, being in the present instance in terms of millimeters and graduated to $\frac{1}{10}$th of a millimeter.

The projected light beam is reflected from the opposite surfaces of the glass wall 14 and the reflected beams then travel in parallel spaced relation with each other as shown. These reflected beams are both focused at the scale diaphragm 35 as by means of an objective lens 37 fixed in a mounting 38 in the lower end of the sight tube 28. By this means the reflected beams are sharply focused at the scale 36 in conjunction with which they are viewed through the eyepiece combination indicated generally at 38 at the outer end of the sight tube. The reflections and scale appear substantially as shown in Figure 5 where the spaced reflected images are shown at 39 and 40, respectively. The distance between the reflected beams 39 and 40 thus read from the scale gives the distance between the opposite surfaces of the wall 14, or, in other words, the distance between the reflected beams as read from the scale gives the thickness of the glass wall or plate 14 in millimeters. For the purpose of assuring sufficient illumination to render the measuring scale clearly visible, provision may be made for some general illumination from the opposite side of the body to be measured as indicated, for example, by the arrows marked A in Figure 1.

The invention thus affords an efficient self-contained instrument for quickly and conveniently measuring the thickness of a transparent plate or wall, entirely from one side of the latter, as particularly convenient, for example, in measuring walls having one or more inaccessible surfaces as, for example, the wall of an electric light bulb, and the combination with the optical system of the instrument of a light source such as described provides for the accurate use of the instrument independently of surrounding light conditions. Furthermore, the construction described for the light projecting portion of the instrument renders it independent of external sources of power and connections and provides for the convenient variation of the power, the light source, and replacement of parts in use.

I claim as my invention:

1. An instrument for measuring the distance between spaced optical surfaces of a transparent body comprising a source of light and means for projecting a beam therefrom against said optical surfaces at an inclination adapted to produce spaced reflections thereof from said optical surfaces, respectively, lens means for focusing said reflections, and a scale disposed in the path of said reflections for observation in conjunction therewith to measure the distance between said reflections as an indication of the distance between said optical surfaces.

2. An instrument for measuring the distance between spaced optical surfaces of a transparent body comprising a device provided with a source of illumination, means for projecting a beam of light therefrom against said optical surfaces at an inclination adapted to produce spaced reflections from said surfaces respectively, lens means for focusing said reflections, and an eyepiece provided with a scale for observing both of said reflections simultaneously in conjunction with said scale, for measuring the distance between said beam reflections as an indication of the distance between said optical surfaces.

3. An instrument for measuring the distance between spaced optical surfaces of a transparent body comprising a device provided with a source of light for projecting a light beam against said optical surfaces at an inclination adapted to produce spaced reflections of said beam, and a sight tube arranged for observing said reflected beams provided with an objective for focusing said beams, and with an eyepiece and a scale for observation in conjunction with said reflected and focused beams to measure the distance therebetween as a function of the distance between said optical surfaces.

4. An instrument for measuring the distance between spaced optical surfaces of a transparent body comprising a device provided with a source of illumination and with a diaphragm having light obstructing and light transmitting portions for projecting a beam of predetermined form against said optical surfaces at an inclination adapted to produce spaced reflections thereof from said optical surfaces respectively, and an optical system provided with a scale disposed in the path of said reflected beams for observation simultaneously in conjunction therewith to measure the distance between said reflected beams as an indication of the distance between said optical surfaces.

5. An instrument for measuring the distance between spaced optical surfaces of a transparent body comprising a device provided with a source of illumination and with a diaphragm having an aperture for projecting a beam of light against said optical surfaces at an inclination adapted to produce spaced reflections of said beam from said surfaces, respectively, a sight tube provided with a measuring scale, an objective for focusing said reflected beams on said scale, and an eyepiece and means for effecting focusing adjustment of said sight tube.

6. An instrument for measuring the distance between spaced optical surfaces of a transparent body comprising a device provided with a source of illumination and with means for projecting a beam of light against said optical surfaces at an inclination adapted to produce spaced reflections thereof from said surfaces respectively, a sight tube provided with a measuring scale and with lens means for focusing said reflected beams at said scale, and an eyepiece for observing said spaced reflected beams in conjunction with said scale, for measuring the distance between said reflected beams as an indication of the distance between said surfaces.

7. An instrument for measuring the distance between spaced optical surfaces of a transparent body comprising a frame, a projection tube portion on said frame provided with a source of illumination and with means for projecting a beam of light against said optical surfaces at an inclination adapted to produce spaced reflections thereof from said surfaces, and a sight tube portion on said frame provided with a scale and an objective for focusing said reflected beams at said scale, and an eyepiece for observing said spaced reflected beams in conjunction with said scale to measure the distance between said beams as an indication of the distance between said optical surfaces.

8. An instrument for measuring the distance between opposite surfaces of a transparent wall comprising a frame provided with contact means for positioning engagement with one surface of said wall, projecting means on said frame provided with a source of illumination and with a diaphragm for projecting a light beam of predetermined form against said surfaces at an angle adapted to produce spaced reflections therefrom, and a sight tube on said frame provided with lens means and with a scale disposed in the path of said spaced, reflected beams whereby said beams may be observed in conjunction with said scale to measure the distance between said beams as an indication of the thickness of said wall.

9. An instrument for measuring the distance between opposite surfaces of a transparent wall comprising a frame provided with a plurality of spaced contacts for positioning engagement with one surface of said wall, projecting means on said frame provided with a lamp and with an apertured diaphragm for projecting a beam of light against said surfaces at an angle adapted to produce spaced reflections therefrom respectively, and an adjustable sight tube on said frame having a diaphragm marked with a scale, an objective for focusing said spaced reflected beams at said scale, and an eyepiece for observing said scale and reflections for measuring the distance between said reflections in terms of thickness of said wall.

10. An instrument for measuring the thickness of a transparent wall comprising a frame having a plurality of spaced contacts for positioning engagement with one surface of said wall, projection means on said frame provided with an apertured diaphragm, an electric lamp and a battery adjustable to and from position for establishing a circuit through said lamp to project a beam of light against the opposite surfaces of said wall at an inclination adapted to produce spaced reflections therefrom respectively, and means on said frame provided with a scale for observing and measuring the distance between said spaced reflected beams to measure the distance between said wall surfaces.

11. An instrument for measuring the thickness of a transparent wall comprising a frame having a plurality of spaced contacts for positioning engagement with one surface of said wall, projection means on said frame provided with an apertured diaphragm, an electric lamp and a battery adjustable to and from position for establishing a circuit through said lamp to project a beam of light against the opposite surfaces of said wall at an inclination adapted to produce spaced reflections therefrom respectively, an adjustable sight tube on said frame provided with a diaphragm marked with a scale of linear measure, objective lens means for focusing said reflected light beams at said scale, and an eyepiece for observing said reflected beams and scale for measuring the distance between the said reflections in terms of the thickness of said wall.

12. An instrument for measuring the distance between spaced, optical surfaces of a transparent body comprising means for projecting a beam of light against said optical surfaces at an inclination adapted to produce spaced reflections thereof from said optical surfaces, respectively, lens means for focusing said reflections, and a scale disposed in the path of said reflections for observation in conjunction therewith to measure the distance between said reflections as an indication of the distance between said optical surfaces.

13. An instrument for measuring the distance between spaced, optical surfaces of a transparent body comprising a device provided with a diaphragm having light obstructing and light transmitting portions for projecting a light beam of predetermined form against said optical surfaces at an inclination adapted to produce spaced reflections thereof from said optical surfaces respectively, and an optical system provided with a scale disposed in the path of said reflected beams for observation simultaneously in conjunction therewith to measure the distance between said reflected beams as an indication of the distance between said optical surfaces.

GEORGE B. GALLASCH.